Figure 1:
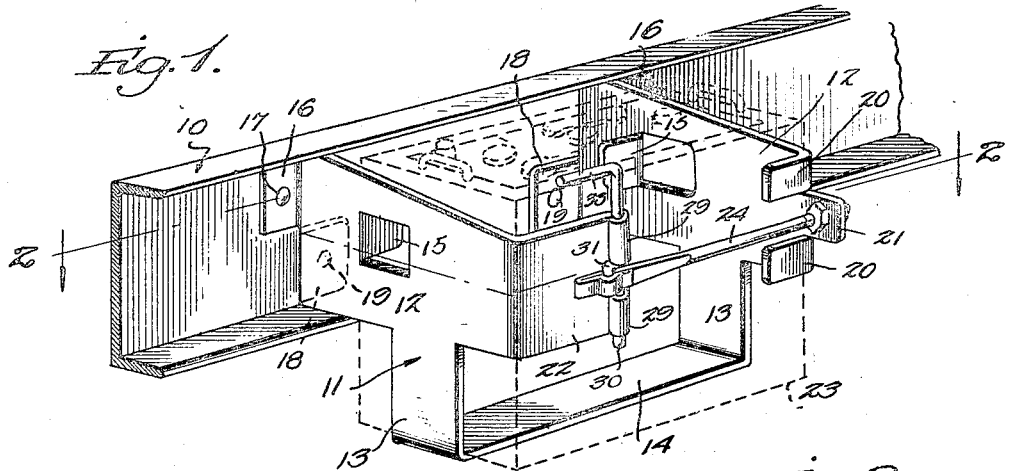

Nov. 23, 1926.  
H. L. ANDREWS  
BATTERY SUPPORT  
Filed Feb. 19, 1926  
1,607,598  
2 Sheets-Sheet 1

Inventor  
HENRY L. ANDREWS

Attorney

Nov. 23, 1926.  1,607,598

H. L. ANDREWS

BATTERY SUPPORT

Filed Feb. 19, 1926  2 Sheets-Sheet 2

Inventor
HENRY L. ANDREWS

By
Attorney

Patented Nov. 23, 1926.

1,607,598

UNITED STATES PATENT OFFICE.

HENRY L. ANDREWS, OF BURKE, SOUTH DAKOTA.

BATTERY SUPPORT.

Application filed February 19, 1926. Serial No. 89,476.

This invention relates to battery supports and more particularly to a support adapted to be carried by a motor vehicle to support the storage battery thereof.

It is the usual practice to mount storage battery containers or supports on a motor vehicle and to provide the supports with clamping members at their upper ends adapted to be clamped downwardly against the handles of the batteries to secure the latter firmly in position. It has been found, however, that regardless of how securely the battery is maintained in position, the jarring of the vehicle and other causes cooperate to break and crack the sealing material at the upper end of the battery when the battery is clamped in position in the manner indicated.

An important object of the present invention is to provide an efficient battery support for securely holding the battery in position without causing any injury thereto.

A further object is to provide a battery support wherein the usual handle clamping means is eliminated, the sides of the battery being clamped to secure the battery in position.

A further object is to provide a battery support formed of resilient sheet metal or the like having clamping means associated therewith whereby portions of the support are clamped against the sides of the battery to maintain it in position, the clamping means being releasable to permit the battery readily to be removed from the support.

A further object is to provide a battery support adapted to be secured to the frame or other part of the vehicle and preferably formed of resilient sheet metal or the like, at least a pair of opposite sides of the support being adapted to be drawn inwardly to clamp against the sides of the battery to maintain it in position, the support including a lower shelf portion extending beneath the bottom of the battery.

A further object is to provide clamping means for a battery support of the above mentioned character wherein a single movement of an operating member is adapted to effect the clamping action, the clamping means being adapted to remain in clamped position until manually released.

Other objects and advantages of the invention will become apparent during the course of the following description.

Figure 2:
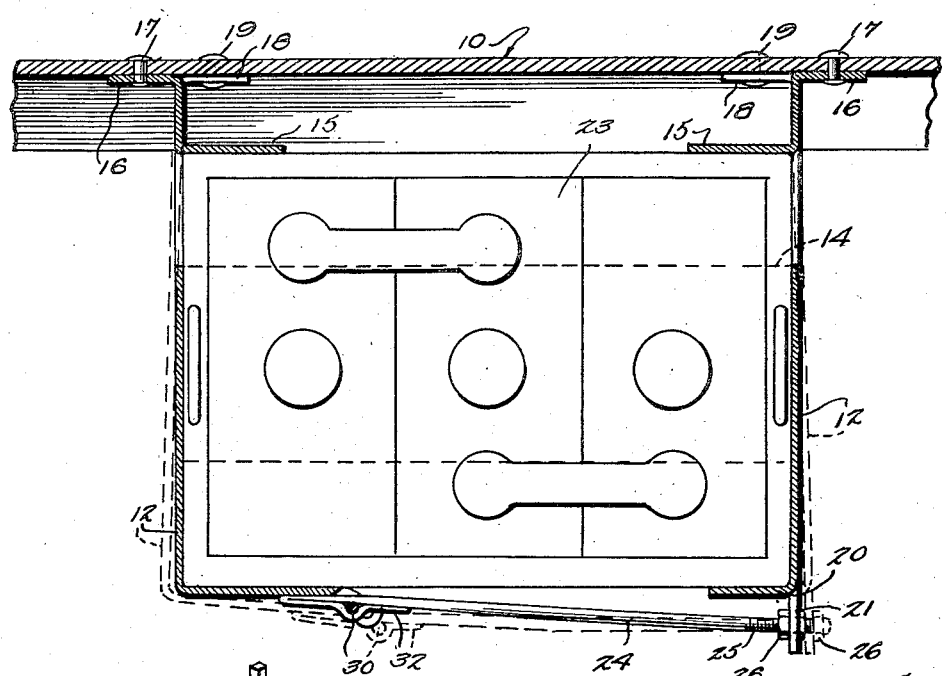
Figures 3, 4:
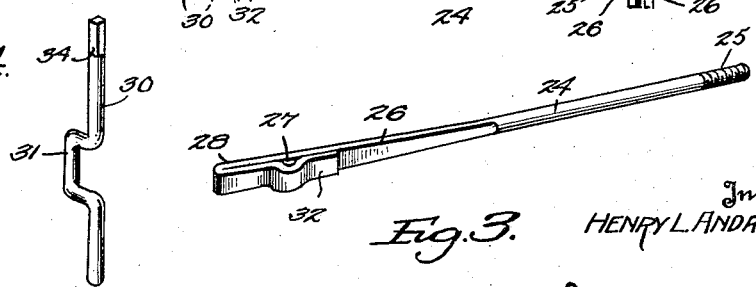
Figure 5:
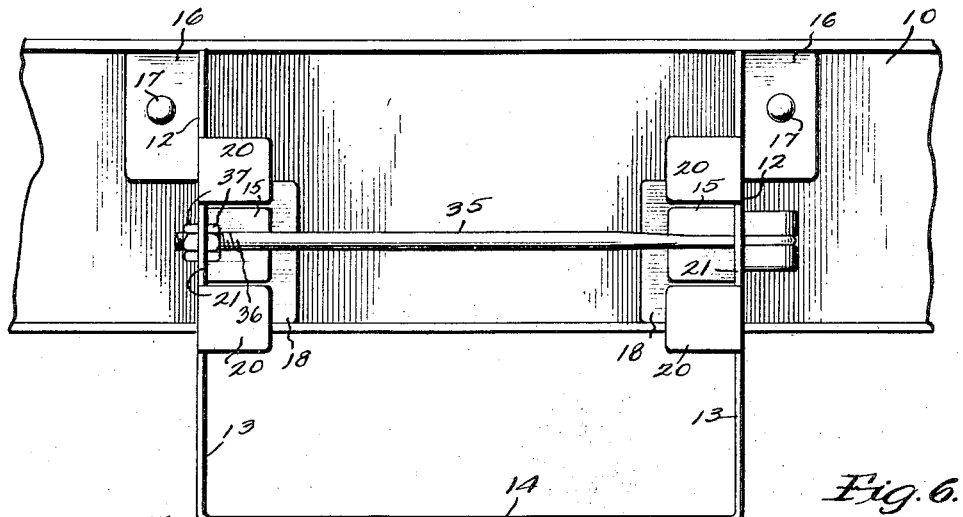
Figure 6:
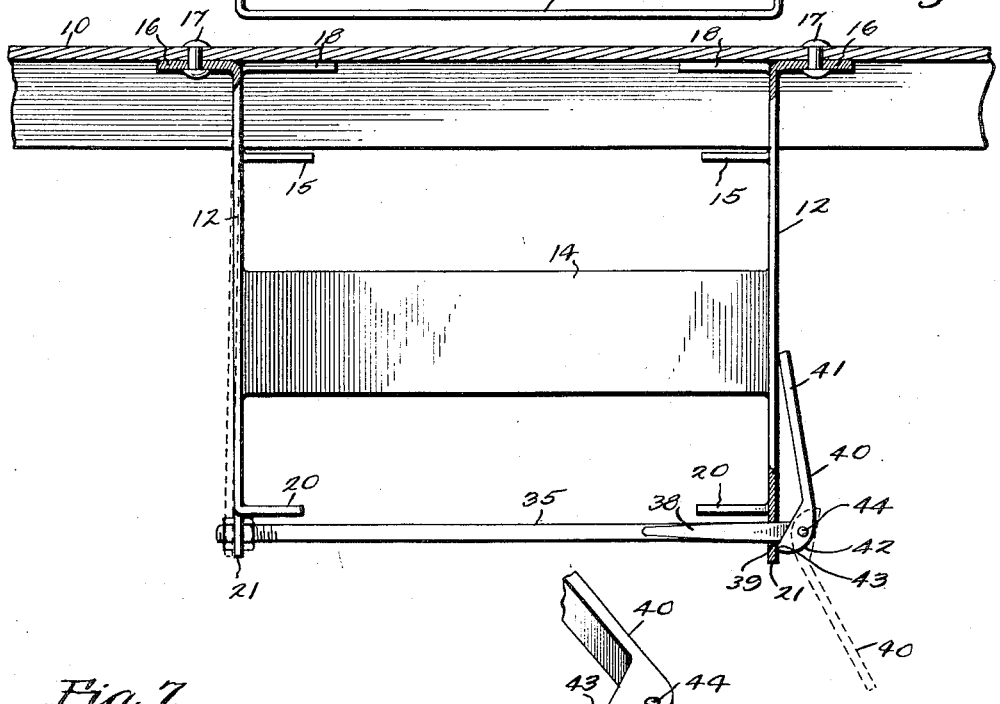
Figure 7:
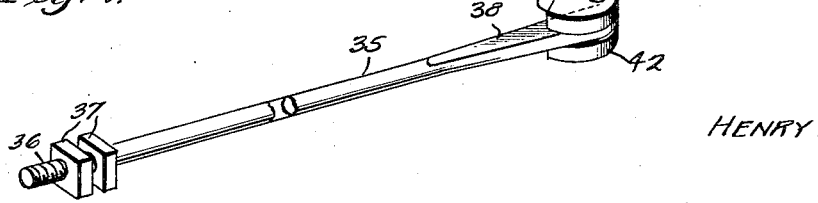

In the drawings I have shown two embodiments of the invention. In this showing:

Figure 1 is a perspective view of the battery support secured in position against the frame of the vehicle, Figure 2 is a horizontal sectional view on line 2—2 of Figure 1, the battery being shown in elevation, Figure 3 is a detail perspective of one form of clamping battery, Figure 4 is a detail perspective of a modified form of operating member, Figure 5 is a side elevation of a modified form of support, Figure 6 is a plan view of the same, and, Figure 7 is a detail perspective of a modified form of clamping bar and operating means therefor.

Referring to the drawings the numeral 10 designates a portion of the frame of a motor vehicle of the usual construction to which a battery support 11 is adapted to be secured. The support 11 is preferably formed of heavy gage sheet metal possessing at least a slight degree of resiliency for a purpose to be described. The support is preferably integral and includes a pair of end plates 12. The end plates 12 are integral with depending arms 13 which are connected by a horizontal lower strap 14 which is adapted to support the battery, as will be apparent. Each of the side plates 12 is provided with an integral stamped-in lip 15, and these lips are adapted to contact with the rear face of the battery. The end plates are further provided with integral lips 16 turned outwardly therefrom and riveted or otherwise secured to the frame 10 as at 17. In order to further secure the support to the frame, the side plates also may be provided with inwardly turned lips 18 riveted or otherwise secured to the frame as at 19.

One of the end plates 12 is provided with a pair of inwardly extending spaced lips 20 and intermediate these lips the metal of the end plate 12 is extended outwardly to form an ear 21 for a purpose to be described. The other end plate 12 is provided with an inwardly extending portion 22 arranged in alinement with the lips 20. A storage battery of the usual type is adapted to be arranged within the support as shown in solid lines in Figure 2 and in dotted lines in Figure 1. The battery rests upon the strap 14 and the front and rear walls thereof substantially fit the space between the lips 15 and the lips 20 and inwardly extending portion 22.

Means are provided for clamping the end plates 12 against the ends of the battery in such a manner that when the clamping means are released, the battery is adapted to loosely fit within the end plates to permit its ready insertion and removal from the support. As shown in Figures 1, 2 and 3, the numeral 24 designates a clamping bar which is substantially circular in cross section at one end and threaded as at 25. The threaded end 25 extends through an opening in the ear 21 and nuts 26 are adapted to secure the bar 24 against endwise movement. The opposite end of the bar 24 is flattened as at 26, and at a point spaced from the extremity of the bar the latter is provided with a bearing opening 27. The end of the bar adjacent the bearing 27 extends a substantial distance therebeyond as at 28 for a purpose to be described. The inwardly extending portion 22 is provided with a pair of spaced extended ends curved as at 29 to provide bearings. A shaft 30 is rotatable in the bearings 29 as shown in Figure 1, and the shaft is provided intermediate its ends with a crank 31. The crank is adapted to be arranged in the bearing 27 of the bar 24. In order to permit the insertion of the crank 31, the bar 24 is provided with a portion 32 bent back upon the bar. A portion of the backwardly bent end 32 of the bar 54 forms a part of the bearing 27 as will be apparent. When inserting the crank 31 the end 32 of the bar may be swung outwardly after which it may be soldered or otherwise secured to the body portion of the bar. Any suitable means, however, may be employed for forming the bearing 27. The shaft 30 extends upwardly at least to the top of the battery as shown in Figure 1 and is provided at its upper end with an operating handle 33 by means of which the shaft may be rotated. Under some conditions, there is insufficient room adjacent the support to permit rotation of the shaft 30 by the handle 33 in which case the upper end of the shaft 30 may be provided with a polygonal portion 34 adapted to be received in a suitable socket wrench to permit the shaft to be turned.

In Figures 5, 6 and 7 of the drawings I have shown a modified form of support. The elements of the modified form are substantially the same as in the form previously described and need not be referred to in detail. In the modified form of the support, the inwardly extended portion 22 previously referred to is omitted and the lips 20 and 21 are duplicated at opposite ends of the support, as will be apparent. An operating rod 35 is provided for drawing the ends 12 of the support inwardly. This rod has a threaded end 36 extending through an opening in the adjacent ear 21 while nuts 37 are adapted to secure the bar to the ear 21, as will be apparent. The opposite end of the bar 35 is flattened as at 38 and extends through a suitable opening 39 formed in the adjacent ear 21. An operating lever 40 is provided for drawing the ends 12 of the support together. As shown, the lever has a handle portion 41 and a cam portion 42 having a high point 43. The cam is bifurcated to receive the flattened end of the bar 35 and a pivot pin 44 connects the bar 35 to the cam lever, as will be apparent.

The operation of the form of the invention illustrated in Figures 1 to 3 inclusive is as follows:

The handle 33 is rotated in a counterclockwise direction from the position shown in Figure 1 whereby rotation of the crank 31 pushes the rod 24 to slightly separate the end plates 12. This action also moves the lips 20 and inwardly extended portion 42 of the support outwardly slightly from their normal position. The battery then may be inserted in position as shown in dotted lines in Figure 1, the bottom of the battery resting upon the strap 14. The handle 33 is then rotated in a clockwise direction, thus drawing the end plates 12 together and clamping them tightly against the ends of the battery. It will be apparent that the end plates contact with the ends of the battery throughout the width thereof to provide an efficient gripping action. The rear face of the battery will contact with the lips 15, while the clamping action referred to brings the lips 20 and the inwardly extended portion 22 inwardly snugly against the front face of the battery. In practice it has been found that the clamping action is very efficient and firmly supports the battery against displacement, and since the supporting action is accomplished by gripping against the sides and ends of the battery no damage is done to the sealing material in the top of the battery. When the device is in clamped position, the end 28 of the bar 24 contacts with the outer face of the inwardly extended portion 22 to limit the turning movement of the shaft 30. As the crank 31 approaches its limit of movement, the center of the crank passes a line between the center of the shaft 30 and the center of the opposite end of the bar 24 as shown in Figure 2, and hence it will be apparent that the gripping action exerted will hold the crank 31 in operative position. The operation of the form of the device shown in Figure 4 is the same as that previously described except that a suitable socket wrench is employed for rotating the shaft.

In the form of the device shown in Figures 5, 6 and 7 the handle 41 is swung to the dotted line position in Figure 6 and the resiliency of the support tends to slightly separate the end plates thereof whereupon the battery may be placed in position. The handle 41 is then moved in a counter-clockwise direction to the solid line position in Figure 6. This action causes the cam 42 to contact with the outer face of the adjacent lip 21, thus drawing the end plates of the support together. Movement of the handle 41 is limited by contact between the handle and the outer face of the adjacent end plate 12. As the lever 40 approaches its limit of movement it will be apparent that the high point 43 of the cam passes the center line of the bar 35 and consequently the clamping action will hold the lever 40 in clamping position thus preventing it from accidentally swinging to open position. In the modified form of the invention it also will be apparent that the clamping action is exerted against the ends of the battery, thus preventing damage thereto in the manner previously referred to. The modified form of the invention is preferably employed on vehicles where more room is available for the operation of the clamping means at the end than at the side of the battery.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A battery support comprising a pair of side plates, a bottom strap member suspended from said side plates and adapted to support a battery therebetween, a clamping bar connected at one end to one of said side plates, and means connected between the opposite end of said clamping bar and the other of said side plates for drawing them together whereby said side plates will be clamped against opposite sides of the battery, said means including a rotatable operating shaft carried by said last named side plate.

2. A device constructed in accordance with claim 1 wherein the last named end of said clamping bar is provided with an opening, said shaft being provided with a crank arranged in said opening.

3. A battery support comprising an integral frame, said frame including a pair of side plates, a lip carried by each side plate near one end thereof, and extending inwardly therefrom, an inwardly extending member carried by the opposite end of one of said plates, the opposite end of the other of said side plates being provided with an inwardly extending lip arranged in alinement with said inwardly extending member, an ear extending from said last named side plate and forming a substantial continuation thereof; a bottom strap member carried by said side plates and adapted to support a battery between said side plates, and between said lips and said inwardly extending member, and means connected between said inwardly extending member and said ear for drawing said side plates toward each other to clamped position against the battery, said first named lips and said inwardly extending member and said last named lip being adapted to engage the battery when said plates are in clamped position.

4. A device constructed in accordance with claim 3 wherein said means includes a clamping bar pivotally connected at one end to said ear, and means connected between the opposite end of said bar and said inwardly extending member for drawing them together.

5. A device constructed in accordance with claim 3 wherein said means comprises a clamping bar pivotally connected at one end to said ear and provided near its opposite end with a vertical opening, and a vertical shaft rotatably carried by said inwardly extending member, said shaft being provided with a crank arranged in said opening whereby rotation of said shaft in one direction is adapted to move said crank to operative position to draw said plates into clamping engagement with opposite sides of the battery, said crank being arranged to pass the center of said shaft as said crank approaches operative position, said bar being provided beyond said crank with an extended portion adapted to contact with said inwardly extending member to limit the movement of said crank beyond operative position.

In testimony whereof I affix my signature.

HENRY L. ANDREWS.